United States Patent
Peng et al.

(10) Patent No.: US 11,532,982 B2
(45) Date of Patent: Dec. 20, 2022

(54) POWER FACTOR CORRECTION CIRCUIT WITH FALL TIME DETECTION

(71) Applicant: Chicony Power Technology Co., Ltd., New Taipei (TW)

(72) Inventors: Tso-Jen Peng, New Taipei (TW); Mao-Song Pan, New Taipei (TW); Yi Ching Su, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 20 days.

(21) Appl. No.: 17/313,007

(22) Filed: May 6, 2021

(65) Prior Publication Data
US 2022/0286045 A1 Sep. 8, 2022

(30) Foreign Application Priority Data
Mar. 8, 2021 (TW) .................................. 110108078

(51) Int. Cl.
*H02M 1/42* (2007.01)
*H02M 3/00* (2006.01)
(Continued)

(52) U.S. Cl.
CPC ......... *H02M 1/4241* (2013.01); *H02M 1/385* (2021.05); *H02M 1/4225* (2013.01);
(Continued)

(58) Field of Classification Search
CPC .... H02M 1/0003; H02M 1/0016; H02M 1/42; H02M 1/4208; H02M 1/4216;
(Continued)

(56) References Cited

U.S. PATENT DOCUMENTS

| 7,765,816 | B2 | 8/2010 | Okaza et al. |
| 7,885,085 | B2 | 2/2011 | Orr et al. |

(Continued)

FOREIGN PATENT DOCUMENTS

| CN | 102130515 | 7/2011 |
| CN | 110226282 | 9/2019 |

(Continued)

OTHER PUBLICATIONS

"Notice of allowance of Taiwan Counterpart Application", dated Oct. 4, 2021, p. 1-p. 4.

*Primary Examiner* — Thienvu V Tran
*Assistant Examiner* — Shahzeb K Ahmad
(74) *Attorney, Agent, or Firm* — JCIPRNET

(57) ABSTRACT

The disclosure provides a power supply and an operation method thereof. The power supply includes a power factor correction (PFC) circuit, a resonant conversion circuit and a dead zone control circuit. The PFC circuit performs power factor correction to output a corrected voltage. The resonant conversion circuit is coupled to the PFC circuit to receive the corrected voltage. The resonant conversion circuit converts the corrected voltage into a converted voltage. The dead zone control circuit is coupled to the resonant conversion circuit to receive the switch voltage. The dead zone control circuit controls the PFC circuit to adjust the corrected voltage. The dead zone control circuit observes the change trend of the falling time of the switch voltage in the deadtime by adjusting the corrected voltage. The dead zone control circuit determines the corrected voltage according to the change trend of the switch voltage.

8 Claims, 7 Drawing Sheets

(51) Int. Cl.
  *H02M 1/38* (2007.01)
  *H02M 3/337* (2006.01)
  *H02M 3/335* (2006.01)
  *H02M 1/00* (2006.01)
(52) U.S. Cl.
  CPC ........... *H02M 3/01* (2021.05); *H02M 3/3376* (2013.01); *H02M 1/007* (2021.05); *H02M 1/38* (2013.01); *H02M 3/33571* (2021.05)
(58) Field of Classification Search
  CPC .. H02M 1/4241; H02M 1/385; H02M 1/4225; H02M 1/425; H02M 1/4258; H02M 3/335; H02M 3/337; H02M 3/3376; H02M 3/33507; H02M 3/33523; H02M 3/01
  See application file for complete search history.

(56) References Cited

U.S. PATENT DOCUMENTS

| | | | |
|---|---|---|---|
| 10,534,029 B1* | 1/2020 | Tsai | H02M 3/3376 |
| 2010/0170292 A1 | 7/2010 | Narikawa et al. | |
| 2010/0217441 A1 | 8/2010 | Eichman | |
| 2014/0307483 A1* | 10/2014 | Sigamani | H02M 3/3376 363/21.04 |
| 2015/0048807 A1* | 2/2015 | Fan | H02M 1/42 323/208 |
| 2016/0105095 A1* | 4/2016 | Mayell | H02M 1/4225 323/205 |
| 2017/0366099 A1 | 12/2017 | Li et al. | |
| 2020/0007032 A1 | 1/2020 | Elferich et al. | |
| 2021/0408899 A1* | 12/2021 | Dai | H02M 1/007 |
| 2022/0123647 A1* | 4/2022 | Mayell | H02M 1/0058 |

FOREIGN PATENT DOCUMENTS

| | | |
|---|---|---|
| CN | 210518114 | 5/2020 |
| CN | 109546851 | 7/2020 |
| CN | 112366936 | 2/2021 |
| TW | 201345119 | 11/2013 |
| TW | 201717532 | 5/2017 |
| TW | I586092 | 6/2017 |
| TW | I670919 | 9/2019 |

* cited by examiner

POWER FACTOR CORRECTION CIRCUIT WITH FALL TIME DETECTION

CROSS-REFERENCE TO RELATED APPLICATION

This application claims the priority benefit of Taiwan application serial no. 110108078, filed on Mar. 8, 2021. The entirety of the above-mentioned patent application is hereby incorporated by reference herein and made a part of this specification.

BACKGROUND

Technical Field

The disclosure relates to a power circuit, and more particularly to a power supply and operation method thereof.

Description of Related Art

All electrical equipment needs to be equipped with a power supply (power converter). In a high-power power converter, a power factor correction (PFC) circuit is connected to an inductance-inductance-capacitance (LLC) resonant converter. LLC resonant converter has the characteristics of zero voltage switching and high efficiency, but it is only suitable for single voltage. Generally speaking, a resonant tank is designed at a resonant frequency point. Many components of power converters (such as feedback voltage divider resistors, resonant inductors, resonant capacitors, etc.) have problem with component tolerance. Component tolerances cause the actual product (power converter) to not necessarily operate at the resonant frequency point. In the case where the power converter is not operating at the resonant frequency point, the efficiency will decrease. How to improve the efficiency of power converters is one of the important issues in this field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a power supply and an operation method thereof to improve the efficiency of the power supply.

The disclosure provides a power supply and an operation method thereof. The power supply includes a power factor correction (PFC) circuit, a resonant conversion circuit and a dead zone control circuit. The PFC circuit performs power factor correction to output a corrected voltage. The resonant conversion circuit is coupled to the PFC circuit to receive the corrected voltage. The resonant conversion circuit converts the corrected voltage into a converted voltage. The dead zone control circuit is coupled to the resonant conversion circuit to receive the switch voltage. The dead zone control circuit controls the PFC circuit to adjust the corrected voltage. The dead zone control circuit observes the change trend of the falling time of the switch voltage in the deadtime by adjusting the corrected voltage. The dead zone control circuit determines the corrected voltage according to the change trend of the switch voltage.

In an embodiment of the disclosure, the operation method includes: performing power factor correction by a PFC circuit to output a corrected voltage; controlling the PFC circuit to adjust the corrected voltage; converting the corrected voltage into the converted voltage by the resonant conversion circuit; observing the change trend of the falling time of the switch voltage of the resonant conversion circuit in the deadtime by adjusting the corrected voltage; and determining the corrected voltage according to the change trend of the switch voltage.

Based on the above, the power supply described in the embodiments of the disclosure observes the change trend of the falling time of the switch voltage of the resonant conversion circuit during the deadtime by adjusting the corrected voltage of the PFC circuit. Based on the change trend of the switch voltage, the dead zone control circuit can acquire which level of the corrected voltage will make the power supply to operate at the resonant frequency point (or the closest to the resonant frequency point). Accordingly, the operation of the power supply can be as close as possible to the resonant frequency point, thereby improving the efficiency of the power supply.

In order to make the foregoing features and advantages of the disclosure more comprehensible, embodiments are described below in detail with the accompanying drawings as follows.

DESCRIPTION OF THE EMBODIMENTS

Figure 1:
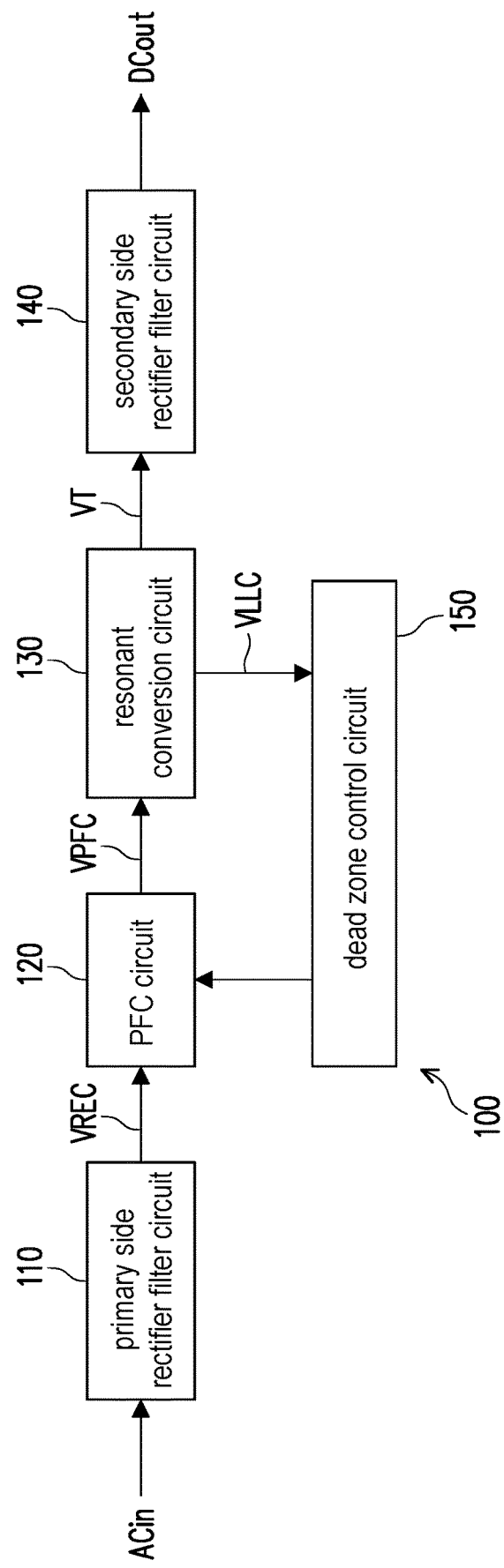
FIG. 1 is a schematic diagram of a circuit block of a power supply according to an embodiment of the disclosure.

A term "couple (or connect)" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. The terms "first", "second" and the like used in the specification or claims are merely for naming the elements or distinguishing between different embodiments or scopes, whereas the quantity of the elements is not limited thereby, and the sequence of element is not limited thereby either. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic diagram of a circuit block of a power supply 100 according to an embodiment of the disclosure. The power supply 100 shown in FIG. 1 includes a primary side rectifier filter circuit 110, a power factor correction (PFC) circuit 120, a resonant conversion circuit 130, a secondary side rectifier filter circuit 140, and dead zone control circuit 150. The input terminal of the primary side rectifier filter circuit 110 receives the AC voltage ACin. The primary side rectifier filter circuit 110 can perform a rectifying and filtering operation on the AC voltage ACin to generate a rectified voltage VREC. This embodiment provides no limitation to the implementation details of the rectifying and filtering operation of the primary side rectifier filter circuit 110. According to actual design, in some embodiments, the rectifying and filtering operation of the primary side rectifier filter circuit 110 may include a conventional rectifying and filtering operation or other rectifying/filtering operations. The output terminal of the primary side rectifier filter circuit 110 is coupled to the input terminal of the PFC circuit 120 to provide a rectified voltage VREC.

Figure 2:
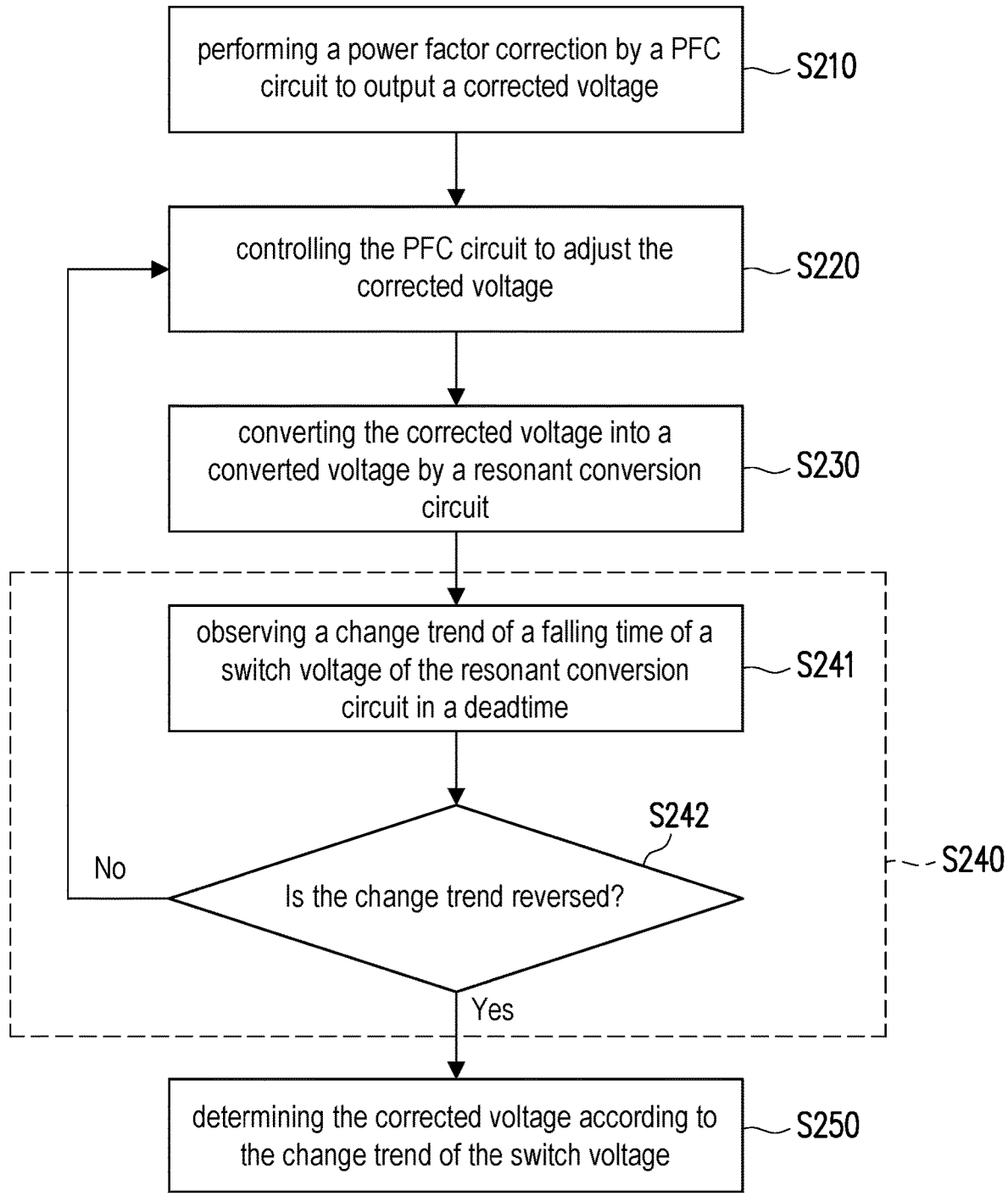
FIG. 2 is a schematic flowchart of an operation method for a power supply according to an embodiment of the disclosure.

FIG. 2 is a schematic flowchart of an operation method for a power supply according to an embodiment of the disclosure. Please refer to FIG. 1 and FIG. 2. In step S210, the PFC circuit 120 may perform power factor correction on the rectified voltage VREC to output the corrected voltage VPFC. This embodiment provides no limitation to the implementation details of the power factor correction of the PFC circuit 120. According to actual design, in some embodiments, the power factor correction of the PFC circuit 120 may include a conventional power factor correction operation or other power factor correction operations. In step S220, the dead zone control circuit 150 may control the PFC circuit 120 to adjust the corrected voltage VPFC.

The resonant conversion circuit 130 is coupled to the PFC circuit 120 to receive the corrected voltage VPFC. In step S230, the resonant conversion circuit 130 may convert the corrected voltage VPFC into a converted voltage VT. In detail, the resonant conversion circuit 130 may perform a switching operation on the corrected voltage VPFC to generate a switch voltage VLLC, and the resonant conversion circuit 130 may perform a resonant conversion operation on the switch voltage VLLC to generate a converted voltage VT. The input terminal of the secondary side rectifier filter circuit 140 is coupled to the output terminal of the resonant conversion circuit 130 to receive the converted voltage VT. The secondary side rectifier filter circuit 140 may perform a rectifying and filtering operation on the converted voltage VT to generate a direct current voltage DCout. This embodiment provides no limitation to the implementation details of the rectifying and filtering operation of the secondary side rectifier filter circuit 140. According to actual design, in some embodiments, the rectifying and filtering operation of the secondary side rectifier filter circuit 140 may include a conventional rectifying and filtering operation or other rectifying/filtering operations.

The dead zone control circuit 150 is coupled to the resonant conversion circuit 130 to receive the switch voltage VLLC. By controlling the PFC circuit 120 (step S220), the dead zone control circuit 150 can adjust the corrected voltage VPFC. In step S240, the dead zone control circuit 150 can observe the change trend of the falling time of the switch voltage VLLC in the deadtime by adjusting the corrected voltage VPFC. In step S250, the dead zone control circuit 150 may determine the target level of the corrected voltage VPFC according to the change trend of the switch voltage VLLC.

For example, in the embodiment shown in FIG. 2, step S240 includes step S241 and step S242. In step S241, the dead zone control circuit 150 can observe (detect) the change trend of the falling time of the switch voltage VLLC in the deadtime. The dead zone control circuit 150 may check (determine) in step S242 whether the change trend of the switch voltage VLLC has a reversal (for example, the falling time that has been increasing has been reduced). When the change trend of the switch voltage VLLC does not reverse (the determining result of step S242 is "No"), the dead zone control circuit 150 may return to step S220 to adjust the corrected voltage VPFC. By analogy, the dead zone control circuit 150 can observe the change trend of the falling time of the switch voltage VLLC in the deadtime by adjusting the corrected voltage VPFC. When the change trend of the switch voltage VLLC is reversed (the determining result of step S242 is "Yes"), the dead zone control circuit 150 may proceed to step S250. In step S250, the dead zone control circuit 150 may use the current level of the corrected voltage VPFC as the target level of the corrected voltage VPFC when the change trend is reversed.

Figure 3:
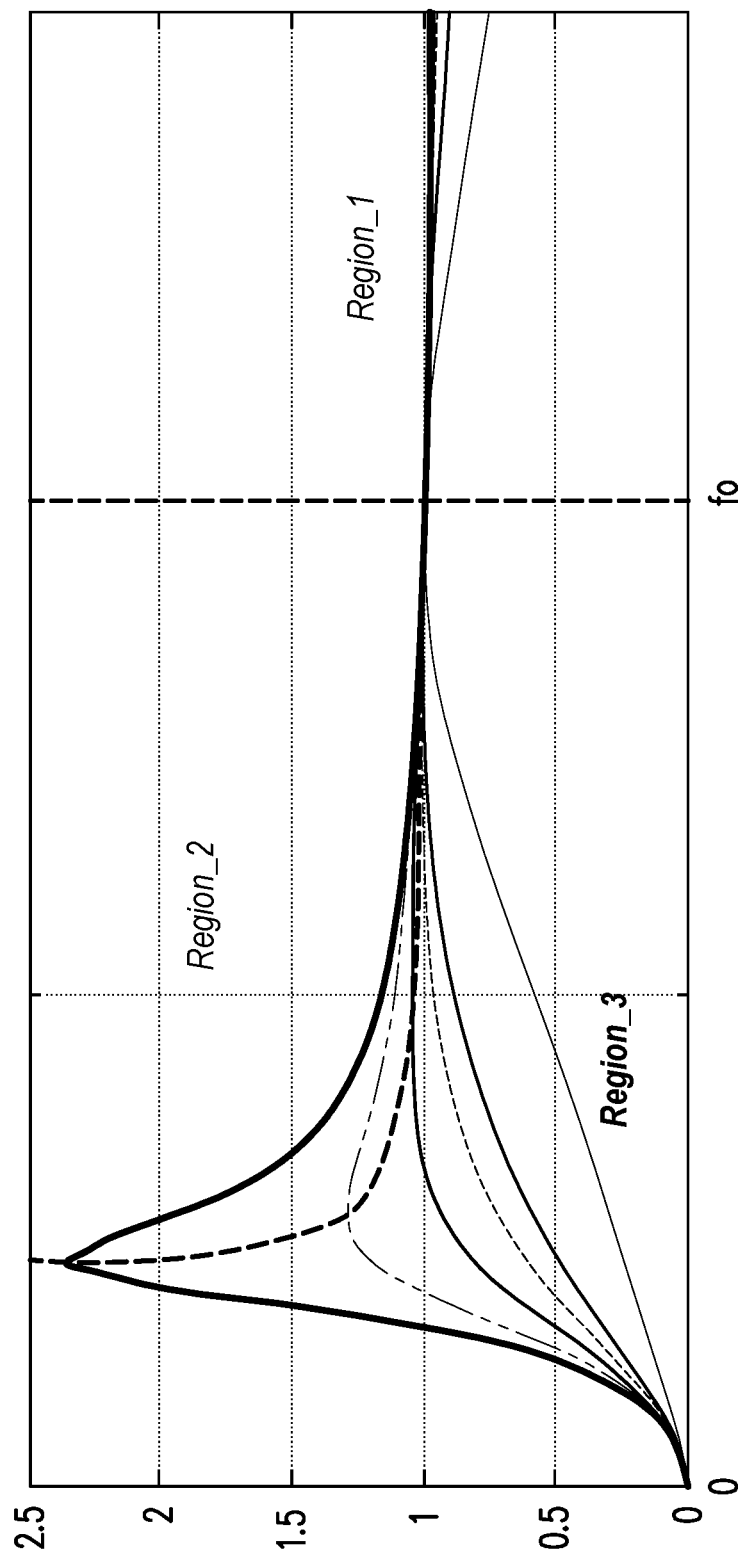
FIG. 3 is a schematic diagram of a voltage gain curve of a resonant conversion circuit according to an embodiment of the disclosure.

FIG. 3 is a schematic diagram of a voltage gain curve of a resonant conversion circuit according to an embodiment of the disclosure. For the resonant conversion circuit 130 shown in FIG. 1, reference may be made to the related description of FIG. 3. The vertical axis shown in FIG. 3 represents the voltage gain, and the horizontal axis represents the switch frequency (or resonant frequency) of the resonant conversion circuit 130. The coordinate space shown in FIG. 3 can be classified into an interval Region_1, an interval Region_2, and an interval Region_3.

Figure 4:
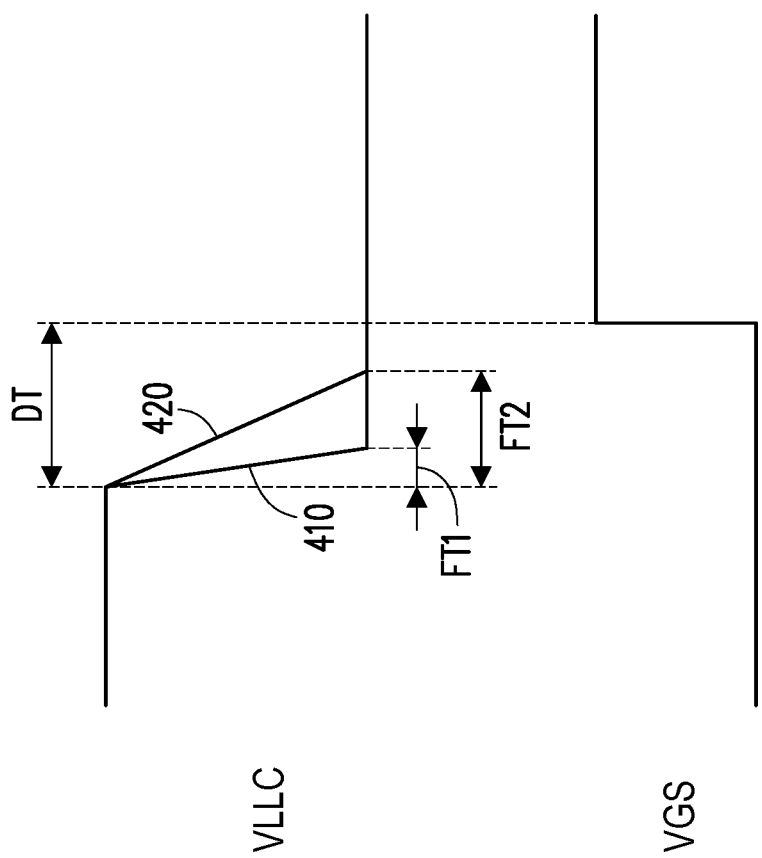
FIG. 4 is a schematic diagram illustrating the waveforms of the corrected voltage and the gate-source voltage according to an embodiment of the disclosure.

FIG. 4 is a schematic diagram illustrating the waveforms of the corrected voltage VPFC and the gate-source voltage VGS of the power switch in the resonant conversion circuit 130 according to an embodiment of the disclosure. Please refer to FIG. 1, FIG. 3 and FIG. 4. When the switch frequency of the resonant conversion circuit 130 is in the high-frequency interval Region_1 (that is, the switch frequency of the resonant conversion circuit 130 is higher than the resonant frequency point Fo), the current of the power switch in the resonant conversion circuit 130 for discharging the charge on the output capacitor of the PFC circuit 120 is higher, and therefore the switch voltage VLLC (refer to the curve 410 shown in FIG. 4) has a fast falling speed in the deadtime DT, that is, the falling time FT1 is shorter. When the switch frequency of the resonant conversion circuit 130 is at the resonant frequency point Fo, the current of the power switch in the resonant conversion circuit 130 for discharging the charge on the output capacitor of the PFC circuit 120 is nearly equal to the current of the magnetizing inductor Lm in the resonant conversion circuit 130, and therefore the switch voltage VLLC (refer to the curve 420 shown in FIG. 4) in the deadtime DT has a slower falling time than in interval Region_1 (that is, the falling time FT2 will be longer). When the switch frequency of the resonant conversion circuit 130 is in the interval Region_2 (that is, the switch frequency of the resonant conversion circuit 130 is lower than the resonant frequency point Fo), because the excitation time of the magnetizing inductor Lm in the resonant conversion circuit 130 is longer, the current of the power switch in the resonant conversion circuit 130 for discharging the charge on the output capacitor of the PFC circuit 120 rises, and therefore the switch voltage VLLC (refer to the curve 410 shown in FIG. 4) in the deadtime DT has a fast falling speed, that is, the falling time FT1 is shorter.

Therefore, the dead zone control circuit 150 can change the corrected voltage VPFC of the PFC circuit 120 by adjusting the switch frequency. In other words, the dead zone control circuit 150 can change the corrected voltage VPFC of the PFC circuit 120 through communication. The dead zone control circuit 150 can observe the change trend of the falling time of the switch voltage VLLC of the resonant conversion circuit 130 in the deadtime DT by adjusting the corrected voltage VPFC, and determine the target level of the corrected voltage VPFC according to the change trend of the switch voltage VLLC. For example, assuming that the switch frequency is in the interval Region_2, the dead zone control circuit 150 can increase the switch frequency of the PFC circuit 120 (raise the corrected voltage VPFC) while observing the switch voltage VLLC of the resonant conversion circuit 130. As the switch frequency (corrected voltage VPFC) increases, the falling time of the switch voltage VLLC in the deadtime DT also becomes higher (for example, as shown in FIG. 4, there is a change from curve 410 to curve 420, making the falling time to change from FT1 to FT2) until the switch frequency of the PFC circuit 120 reaches the resonant frequency point Fo. When the switch frequency of the PFC circuit 120 reaches the resonant frequency point Fo, the switch voltage VLLC in the deadtime DT has the maximum falling time (the falling time FT2 shown in FIG. 4). When the switch frequency of the PFC circuit 120 exceeds the resonant frequency point Fo, the falling time of the switch voltage VLLC in the deadtime DT will be changed to be smaller (that is, the change trend of the falling time of the switch voltage VLLC in the deadtime DT reverses). Therefore, once the change trend of the falling time of the switch voltage VLLC in the deadtime DT is reversed, it means that the switch frequency of the PFC circuit 120 reaches the resonant frequency point Fo.

Assuming that the switch frequency is in the interval Region_1, the dead zone control circuit 150 can decrease the switch frequency of the PFC circuit 120 (reduce the corrected voltage VPFC) while observing the switch voltage VLLC of the resonant conversion circuit 130. In other words, the dead zone control circuit 150 can reduce the corrected voltage VPFC through communication. As the switch frequency (corrected voltage VPFC) is reduced, the falling time of the switch voltage VLLC in the deadtime DT also increases (for example, as shown in FIG. 4, the curve 410 changes to the curve 420, making the falling time to change from FT1 to FT2) until the switch frequency of the PFC circuit 120 reaches the resonant frequency point Fo. When the switch frequency of the PFC circuit 120 reaches the resonant frequency point Fo, the falling time FT2 of the switch voltage VLLC in the deadtime DT is the maximum. When the switch frequency of the PFC circuit 120 is lower than the resonant frequency point Fo, the falling time of the switch voltage VLLC in the deadtime DT will be changed to be smaller (that is, the change trend of the falling time of the switch voltage VLLC in the deadtime DT is reversed). Therefore, once the change trend of the falling time of the switch voltage VLLC in the deadtime DT is reversed, it means that the switch frequency of the PFC circuit 120 reaches the resonant frequency point Fo.

In summary, the dead zone control circuit 150 can observe the change trend of the falling time of the switch voltage VLLC of the resonant conversion circuit 130 in the deadtime DT by adjusting the corrected voltage VPFC of the PFC circuit 120. Based on the changing trend of the switch voltage VLLC, the dead zone control circuit 150 can acquire which level of the corrected voltage VPFC will make the power supply 100 to operate at the resonant frequency point Fo (or the closest to the resonant frequency point Fo). Accordingly, the operation of the power supply 100 can be as close as possible to the resonant frequency point Fo, thereby improving the efficiency of the power supply 100.

Figure 5:
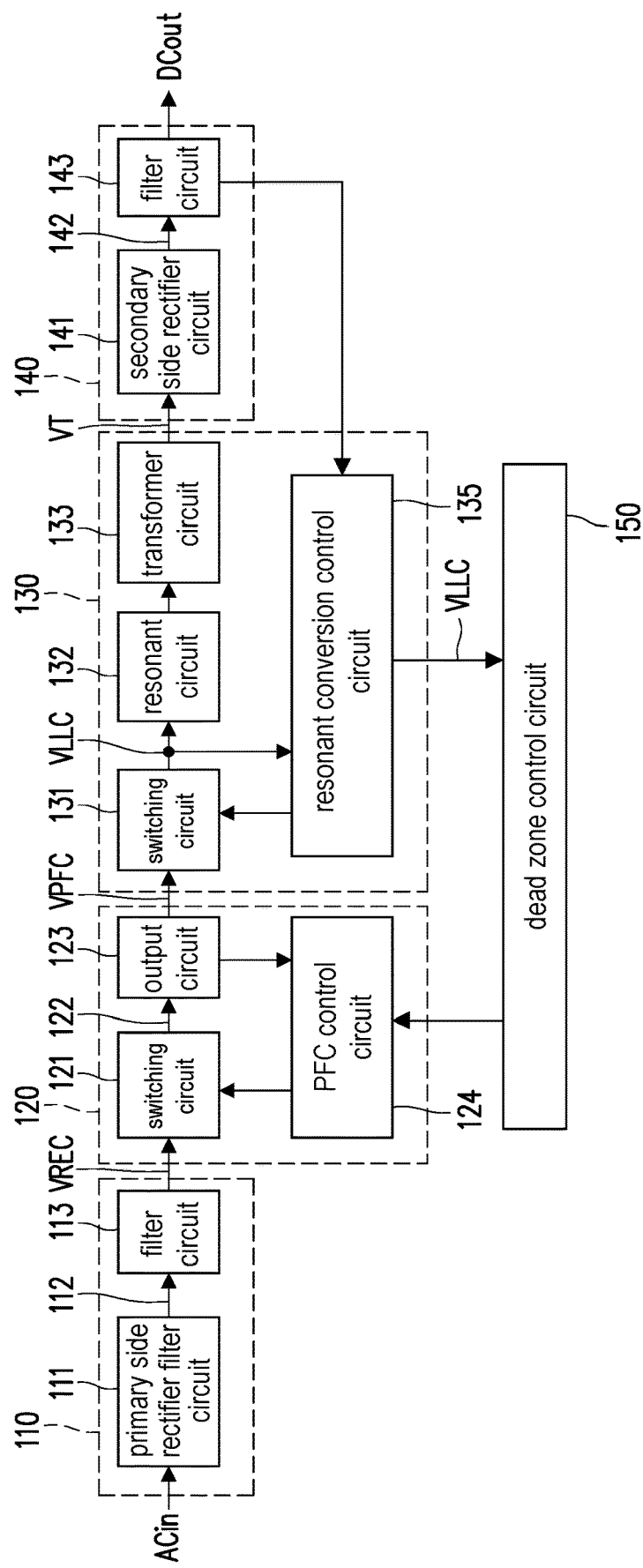
FIG. 5 is a circuit block diagram illustrating the primary side rectifier filter circuit, the PFC circuit, the resonant conversion circuit, and the secondary side rectifier filter circuit shown in FIG. 1 according to an embodiment of the disclosure.

FIG. 5 is a circuit block diagram illustrating the primary side rectifier filter circuit 110, the PFC circuit 120, the resonant conversion circuit 130, and the secondary side rectifier filter circuit 140 shown in FIG. 1 according to an embodiment of the disclosure. The primary side rectifier filter circuit 110 shown in FIG. 5 includes a primary side rectifier circuit 111 and a filter circuit 113. The input terminal of the primary side rectifier circuit 111 receives an AC voltage ACin. The primary side rectifier circuit 111 can perform a rectifying operation on the AC voltage ACin to generate a rectified voltage 112. According to actual design, the primary side rectifier circuit 111 may include a bridge rectifier circuit or other rectifier circuits. The input terminal of the filter circuit 113 is coupled to the output terminal of the primary side rectifier circuit 111 to receive the rectified voltage 112. The filter circuit 113 may perform a filtering operation on the rectified voltage 112 to generate a rectified voltage VREC. According to the actual design, the filter circuit 113 may include a conventional filter circuit or other filter circuits.

The PFC circuit 120 shown in FIG. 5 includes a switching circuit 121, an output circuit 123, and a PFC control circuit 124. The input terminal of the switching circuit 121 is coupled to the output terminal of the filter circuit 113 to receive the rectified voltage VREC. The PFC control circuit 124 can control the power switch inside the switching circuit 121 to adjust the output voltage 122. The input terminal of the output circuit 123 is coupled to the output terminal of the switching circuit 121 to receive the output voltage 122. The output circuit 123 may perform a filtering operation on the output voltage 122 to generate a corrected voltage VPFC to the resonant conversion circuit 130. According to actual design, the output circuit 123 may include a capacitor or other filter circuits/components.

The PFC control circuit 124 is coupled to the output circuit 123 to receive the corrected voltage VPFC. Based on the corrected voltage VPFC, the PFC control circuit 124 can control the switch frequency and/or the duty ratio of the switching circuit 121 to dynamically adjust the corrected voltage VPFC. The dead zone control circuit 150 can notify the PFC control circuit 124 to adjust the corrected voltage VPFC according to the change trend of the switch voltage VLLC of the resonant conversion circuit 130.

The resonant conversion circuit 130 shown in FIG. 5 includes a switching circuit 131, a resonant circuit 132, a transformer circuit 133, and a resonant conversion control circuit 135. The input terminal of the switching circuit 131 is coupled to the PFC circuit 120 to receive the corrected voltage VPFC. The resonant conversion control circuit 135 can control the power switch inside the switching circuit 131 to output and adjust the switching voltage VLLC. The resonant conversion control circuit 135 can further detect the switch voltage VLLC, and provide the detection result (detected switch voltage VLLC) to the dead zone control circuit 150. The input terminal of the resonant circuit 132 is coupled to the output terminal of the switching circuit 131 to receive the switch voltage VLLC. The resonant circuit 132 may perform a resonance operation on the switch voltage VLLC. According to the actual design, the resonant circuit 132 may include a conventional resonant tank or other resonant tanks. The primary side of the transformer circuit 133 is coupled to the resonant circuit 132. The secondary side of the transformer circuit 133 is coupled to the input terminal of the secondary side rectifier filter circuit 140 to provide the converted voltage VT.

The secondary side rectifier filter circuit 140 shown in FIG. 5 includes a secondary side rectifier circuit 141 and a filter circuit 143. The input terminal of the secondary side rectifier circuit 141 is coupled to the output terminal of the transformer circuit 133 to receive the converted voltage VT. The secondary side rectifier circuit 141 may perform a rectifying operation on the converted voltage VT to generate a rectified voltage 142. According to actual design, the secondary side rectifier circuit 141 may include a bridge rectifier circuit or other rectifier circuits. The input terminal of the filter circuit 143 is coupled to the output terminal of the secondary side rectifier circuit 141 to receive the rectified voltage 142. The filter circuit 143 may perform a filtering operation on the rectified voltage 142 to generate a direct current voltage DCout. According to actual design, the filter circuit 143 may include a conventional filter circuit or other filter circuits.

According to different design requirements, the PFC control circuit 124, the resonant conversion control circuit 135, and/or the dead zone control circuit 150 can be implemented in the form of hardware, firmware, or software (i.e., program) or a combination of multiple of the above three. In terms of hardware, the PFC control circuit 124, the resonant conversion control circuit 135, and/or the dead zone control circuit 150 can be implemented in a logic circuit on an integrated circuit. The functions of the PFC control circuit 124, the resonant conversion control circuit 135, and/or the dead zone control circuit 150 can be implemented in the form of hardware by using hardware description languages (for example, Verilog HDL or VHDL) or other suitable programming languages. For example, the functions of the PFC control circuit 124, the resonant conversion control circuit 135, and/or the dead zone control circuit 150 can be implemented in one or more controllers, microcontrollers, microprocessors, Application-specific integrated circuit (ASIC), digital signal processor (DSP), Field Programmable Gate Array (FPGA) and/or various logic blocks, modules and circuits in other processing units.

In the form of software and/or firmware, the functions of the PFC control circuit 124, the resonant conversion control circuit 135, and/or the dead zone control circuit 150 can be implemented as programming codes. For example, the PFC control circuit 124, the resonant conversion control circuit 135, and/or the dead zone control circuit 150 can be implemented by using general programming languages (such as C, C++ or combination languages) or other suitable programming languages. The programming code can be recorded/stored in a "non-transitory computer-readable medium". In some embodiments, the non-transitory computer-readable medium includes, for example, Read Only Memory (ROM), programmable logic circuits, and/or storage devices. The storage device includes a hard disk drive (HDD), a solid-state drive (SSD) or other storage devices. A central processing unit (CPU), a controller, a microcontroller or a microprocessor can read and execute the programming code from the non-temporary computer-readable medium, thereby realizing the functions of the PFC control circuit 124, the resonant conversion control circuit 135, and/or the dead zone control circuit 150.

Figure 6:
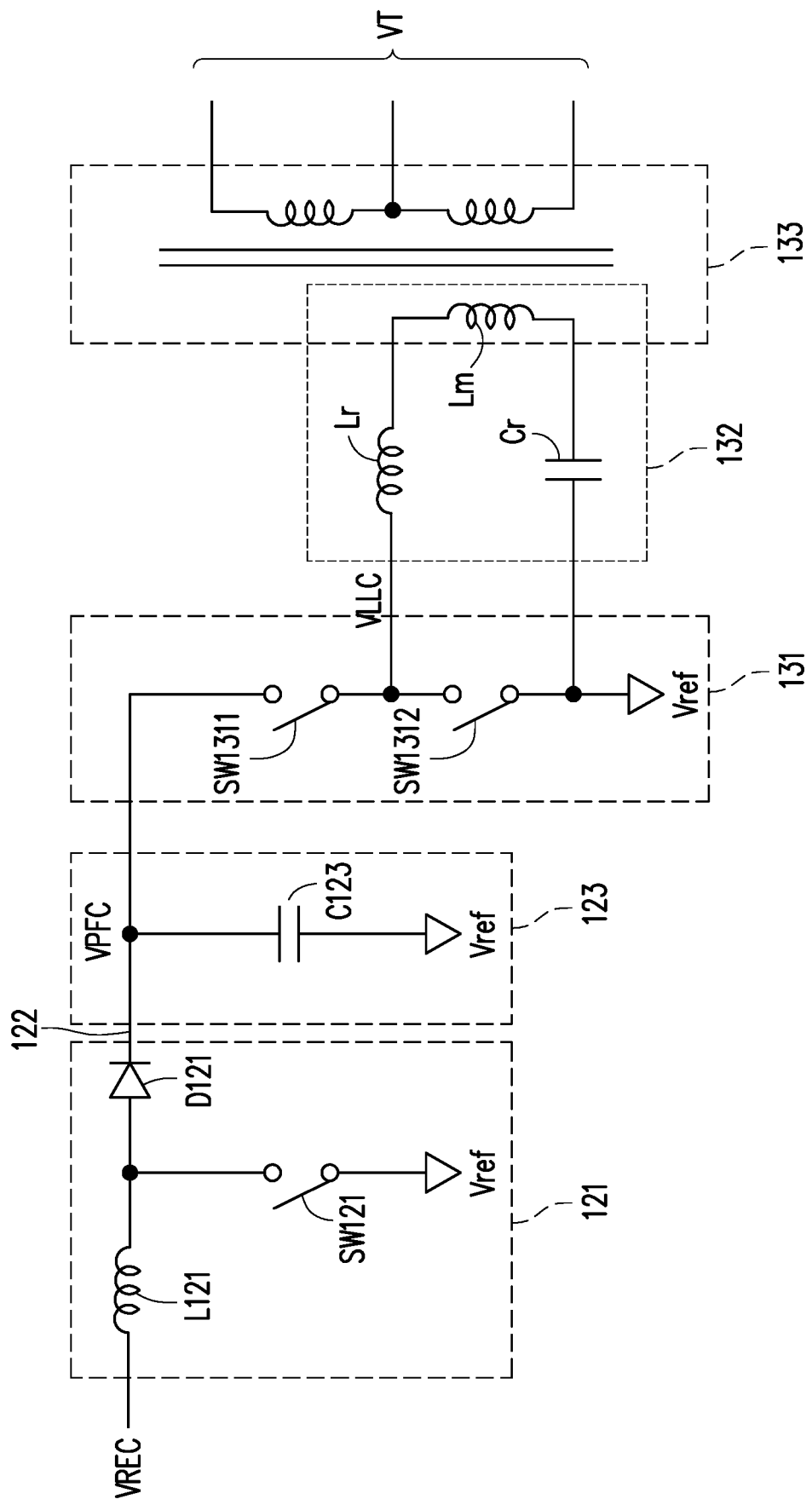
FIG. 6 is a circuit block diagram illustrating the switching circuit, output circuit, switching circuit, resonant circuit, and transformer circuit shown in FIG. 5 according to an embodiment of the disclosure.

FIG. 6 is a circuit block diagram illustrating the switching circuit 121, the output circuit 123, the switching circuit 131, the resonant circuit 132, and the transformer circuit 133 shown in FIG. 5 according to an embodiment of the disclosure. The switching circuit 121 shown in FIG. 6 includes an inductor L121, a diode D121, and a power switch SW121. Please refer to FIG. 5 and FIG. 6. The first terminal of the inductor L121 is coupled to the output terminal of the filter circuit 113 to receive the rectified voltage VREC. The anode of the diode D121 and the first terminal of the power switch SW121 are coupled to the second terminal of the inductor L121. The second terminal of the power switch SW121 is coupled to the reference voltage Vref (for example, the ground voltage or other fixed voltages). The PFC control circuit 124 can control the power switch SW121 inside the switching circuit 121, for example, adjust the switch frequency and/or the duty ratio of the power switch SW121 to adjust the output voltage 122. In the embodiment shown in FIG. 6, the output voltage 122 is used as the corrected voltage VPFC. The output circuit 123 shown in FIG. 6 includes a capacitor C123. The first terminal of the capacitor C123 is coupled to the cathode of the diode D121 to receive the output voltage 122 (corrected voltage VPFC). The second terminal of the capacitor C123 is coupled to the reference voltage Vref.

The switching circuit 131 shown in FIG. 6 includes a power switch SW1311 and a power switch SW1312. The first terminal of the power switch SW1311 is coupled to the output circuit 123 to receive the corrected voltage VPFC. The second terminal of the power switch SW1311 is coupled to the resonant circuit 132 to provide the switch voltage VLLC. The first terminal of the power switch SW1312 is coupled to the second terminal of the power switch SW1311. The second terminal of the power switch SW1312 is coupled to the reference voltage Vref. Reference made to the drain-source voltage of the power switch SW1312 can be derived from the related description of the corrected voltage VPFC shown in FIG. 4, and reference made to the gate-source voltage of the power switch SW1312 can be derived from the related description of the gate-source voltage VGS shown in FIG. 4.

The resonant circuit 132 shown in FIG. 6 includes a resonant inductor Lr, a magnetizing inductor Lm, and a resonant capacitor Cr. The first terminal of the resonant inductor Lr is coupled to the output terminal of the switching circuit 131 to receive the switch voltage VLLC. The first terminal of the magnetizing inductor Lm is coupled to the second terminal of the resonant inductor Lr. The first terminal of the resonant capacitor Cr is coupled to the second terminal of the magnetizing inductor Lm. The second terminal of the resonant capacitor Cr is coupled to the reference voltage Vref.

The transformer circuit 133 shown in FIG. 6 includes a transformer. In the embodiment shown in FIG. 6, the primary side coil of the transformer is used as the magnetizing inductor Lm of the resonant circuit 132. Based on the magnetic flux change of the magnetizing inductor Lm, the secondary side coil of the transformer can generate the converted voltage VT to the secondary side rectifier filter circuit 140.

Figure 7:
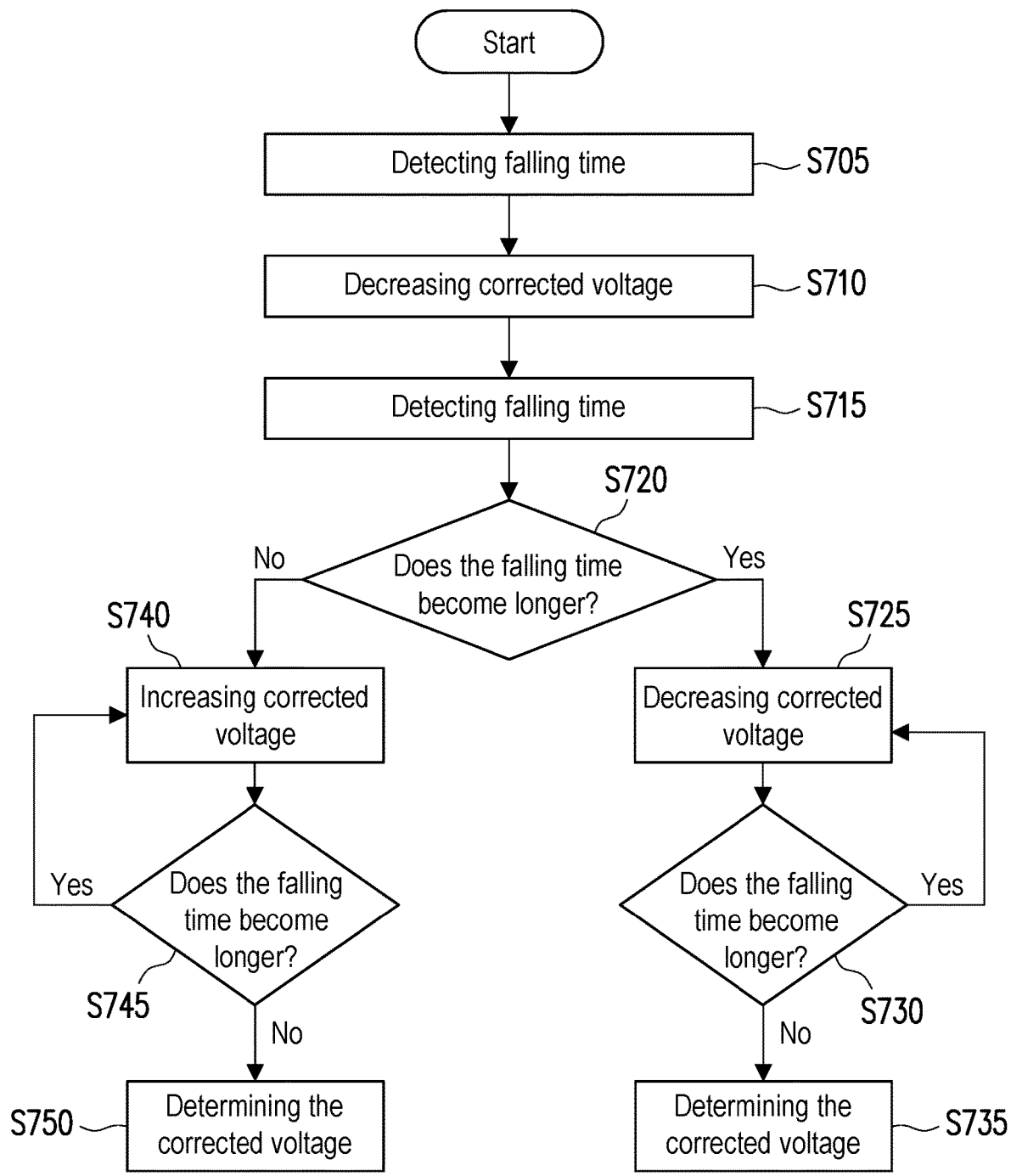
FIG. 7 is a schematic flowchart of an operation method of a power supply according to another embodiment of the disclosure.

FIG. 7 is a schematic flowchart of an operation method of a power supply according to another embodiment of the disclosure. Please refer to FIG. 4 to FIG. 7. In step S705, the dead zone control circuit 150 can detect the falling time of the switch voltage VLLC in the deadtime DT through the resonant conversion control circuit 135. The dead zone control circuit 150 can reduce the corrected voltage VPFC through the PFC control circuit 124 (step S710), and then detect the falling time of the switch voltage VLLC in the deadtime DT again through the resonant conversion control circuit 135 (step S715), so as to observe the change trend of the falling time of the switch voltage VLLC in the deadtime DT.

For example, the deadtime DT may be divided into a plurality of intervals, and the falling time of the switch voltage VLLC in the deadtime DT corresponds to one of these intervals. The dead zone control circuit 150 can detect and determine at the first time point in which interval (assumed to be the first interval) that the falling time of the switch voltage VLLC falls in the deadtime DT (step S705). Next, the dead zone control circuit 150 can reduce the corrected voltage VPFC (step S710), and then again detect and determine in which interval (assumed to be the second interval) that the falling time of the switch voltage VLLC falls in the deadtime DT (step S715). The dead zone control circuit 150 can compare the first interval with the second interval to observe whether there is a change in the falling time of the switch voltage VLLC in the deadtime DT. By observing the relationship between the first interval and the second interval, the dead zone control circuit 150 can acquire the change trend of the falling time of the switch voltage VLLC in the deadtime DT.

In step S720, the dead zone control circuit 150 may check and determine the change trend of the falling time of the switch voltage VLLC in the deadtime DT. When the change trend of the switch voltage VLLC indicates that the "falling time becomes longer" (that is, the determining result of step S720 is "Yes"), the dead zone control circuit 150 may proceed to step S725. In the case where the falling time of the switch voltage VLLC in the deadtime DT is increased due to the decrease in the corrected voltage VPFC, the dead zone control circuit 150 may continue to decrease the corrected voltage VPFC (step S725) to observe the reversal of the change trend of the falling time (step S730).

For example, the dead zone control circuit 150 may check and determine again the change trend of the falling time of the switch voltage VLLC in the deadtime DT after reducing the corrected voltage VPFC (step S730). When the change trend of the switch voltage VLLC indicates that "the falling time becomes longer" (that is, the determining result of step S730 is "Yes"), the dead zone control circuit 150 may return to step S725. By analogy, the dead zone control circuit 150 can observe whether the change trend of the falling time of the switch voltage VLLC in the deadtime DT is reversed by adjusting the corrected voltage VPFC. When the change trend of the switch voltage VLLC indicates that "the falling time becomes shorter" (that is, the determining result of step S730 is "No"), under the circumstances, the change trend of the switch voltage VLLC is reversed, and the dead zone control circuit 150 may enter step S735.

In step S735, the dead zone control circuit 150 may determine the corrected voltage VPFC according to the reversal of the change trend of the falling time of the switch voltage VLLC in the deadtime DT. For example, the dead zone control circuit 150 may use the current level of the corrected voltage VPFC when the change trend is reversed as the target level of the corrected voltage VPFC. That is, the dead zone control circuit 150 may use the current switch frequency and/or the current duty ratio of the switching circuit 121 when the change trend is reversed as the target switch frequency and/or the target duty ratio.

In step S720, when the change trend of the switch voltage VLLC indicates that "the falling time becomes shorter" (that is, the determining result of step S720 is "No"), the dead zone control circuit 150 may proceed to step S740. In the case where the falling time of the switch voltage VLLC in the deadtime DT is shortened due to the decrease in the corrected voltage VPFC, the dead zone control circuit 150 may increase the corrected voltage VPFC (step S740) to observe the reversal of the change trend of the falling time (step S745).

For example, the dead zone control circuit 150 may check and determine again the change trend of the falling time of the switch voltage VLLC in the deadtime DT after increasing the corrected voltage VPFC (step S745). When the change trend of the switch voltage VLLC indicates that "the falling time becomes longer" (that is, the determining result of step S745 is "Yes"), the dead zone control circuit 150 may return to step S740. By analogy, the dead zone control circuit 150 can observe whether the change trend of the falling time of the switch voltage VLLC in the deadtime DT is reversed by adjusting the corrected voltage VPFC. When the change trend of the switch voltage VLLC indicates that "the falling time becomes shorter" (that is, the determining result of step S745 is "No"), under the circumstances, the change trend of the switch voltage VLLC is reversed, and the dead zone control circuit 150 can enter step S750. In step S750, the dead zone control circuit 150 may determine the corrected voltage VPFC according to the reversal of the change trend of the falling time of the switch voltage VLLC in the deadtime DT. Step S750 can be deduced by referring to the related description of step S735, so no further description is incorporated herein.

That is, the dead zone control circuit 150 can reduce the corrected voltage VPFC to observe the change in the interval corresponding to the falling time of the switch voltage VLLC. In step S710, when the corrected voltage VPFC is reduced, and which causes the interval corresponding to the falling time to change to the right (the falling time becomes longer), the dead zone control circuit 150 may continue to reduce the corrected voltage VPFC in step S725 to observe the reversal of the change in the interval corresponding to the falling time. In step S710, when the corrected voltage VPFC is reduced, and which causes the interval corresponding to the falling time to change to the left (the falling time becomes shorter), the dead zone control circuit 150 may increase the corrected voltage VPFC in step S740 to observe the reversal of the change in the interval corresponding to the falling time. The dead zone control circuit 150 can determine the corrected voltage VPFC according to the reversal of the change in the interval corresponding to the falling time.

In summary, the power supply 100 described in the foregoing embodiments can observe the change trend of the falling time of the switch voltage VLLC of the switching circuit 131 in the deadtime DT by adjusting the corrected voltage VPFC of the output circuit 123. Based on the change trend of the switch voltage VLLC, the dead zone control circuit 150 can acquire which level of the corrected voltage VPFC will make the power supply 100 to operate at the resonant frequency point Fo (or the closest to the resonant frequency point Fo). Accordingly, the operation of the power supply 100 can be as close as possible to the resonant frequency point Fo, thereby improving the efficiency of the power supply 100.

Although the disclosure has been disclosed as above by way of embodiments, it is not intended to limit the disclosure. Any person with ordinary knowledge in the technical field can make some changes and decorations without departing from the spirit and scope of the disclosure, so the protection scope of the disclosure shall be determined by the scope of the attached claims.

What is claimed is:

1. A power supply, comprising:
a power factor correction (PFC) circuit, configured to perform a power factor correction to output a corrected voltage;
a resonant conversion circuit, coupled to the PFC circuit to receive the corrected voltage, and configured to convert the corrected voltage into a converted voltage; and
a dead zone control circuit, coupled to the resonant conversion circuit to receive a switch voltage, and configured to control the PFC circuit to adjust the corrected voltage, wherein the dead zone control circuit observes a change trend of a falling time of the switch voltage in a deadtime by adjusting the corrected voltage, and the dead zone control circuit determines the corrected voltage according to the change trend of the switch voltage,
wherein the dead zone control circuit reduces the corrected voltage to observe the change trend of the falling time of the switch voltage in the deadtime,
in the case that the falling time becomes longer due to the decrease of the corrected voltage, the dead zone control circuit continues to decrease the corrected voltage to observe a reversal of the change trend of the falling time;
in the case that the falling time becomes shorter due to the decrease of the corrected voltage, the dead zone control circuit increases the corrected voltage to observe the reversal of the change trend of the falling time; and
the dead zone control circuit determines the corrected voltage according to the reversal of the change trend.

2. The power supply according to claim 1, wherein the PFC circuit comprises:
a switching circuit having an input terminal to receive a rectified voltage;
an output circuit having an input terminal coupled to an output terminal of the switching circuit, configured to output the corrected voltage to the resonant conversion circuit; and
a PFC control circuit configured to control the switching circuit to adjust the corrected voltage,
wherein the dead zone control circuit notifies the PFC control circuit to adjust the corrected voltage according to the change trend of the switch voltage.

3. The power supply according to claim 1, wherein the resonant conversion circuit comprises:
a switching circuit having an input terminal coupled to the PFC circuit to receive the corrected voltage, and configured to output the switch voltage;
a resonant circuit having an input terminal coupled to the switching circuit to receive the switch voltage;
a transformer circuit having a primary side coupled to the resonant circuit; and
a resonant conversion control circuit configured to control the switching circuit and detect the switch voltage to provide a detection result to the dead zone control circuit.

4. The power supply according to claim 1, further comprising:
a primary side rectifier filter circuit having an output terminal coupled to an input terminal of the PFC circuit to provide a rectified voltage.

5. The power supply according to claim 1, further comprising:
a secondary side rectifier filter circuit having an input terminal coupled to an output terminal of the resonant conversion circuit to receive the converted voltage.

6. A power supply, comprising:
a power factor correction (PFC) circuit, configured to perform a power factor correction to output a corrected voltage;
a resonant conversion circuit, coupled to the PFC circuit to receive the corrected voltage, and configured to convert the corrected voltage into a converted voltage; and
a dead zone control circuit, coupled to the resonant conversion circuit to receive a switch voltage, and configured to control the PFC circuit to adjust the corrected voltage, wherein the dead zone control circuit observes a change trend of a falling time of the switch voltage in a deadtime by adjusting the corrected voltage, and the dead zone control circuit determines the corrected voltage according to the change trend of the switch voltage,
wherein the deadtime is divided into a plurality of intervals, the falling time of the switch voltage in the deadtime corresponds to one of the intervals, and the dead zone control circuit reduces the corrected voltage to observe a change in the interval corresponding to the falling time of the switch voltage,
in the case where the corrected voltage is reduced, and which causes the interval corresponding to the falling time to change to the right, the dead zone control circuit continues to reduce the corrected voltage to observe a reversal of the change in the interval corresponding to the falling time;
in the case where the corrected voltage is reduced, and which causes the interval corresponding to the falling time to change to the left, the dead zone control circuit increases the corrected voltage to observe the reversal of the change in the interval corresponding to the falling time; and
the dead zone control circuit determines the corrected voltage according to the reversal of the change in the interval corresponding to the falling time.

7. An operation method of a power supply, comprising:
performing a power factor correction by a PFC circuit to output a corrected voltage;
controlling the PFC circuit to adjust the corrected voltage;
converting the corrected voltage into a converted voltage by a resonant conversion circuit;
observing a change trend of a falling time of a switch voltage of the resonant conversion circuit in a deadtime by adjusting the corrected voltage;
determining the corrected voltage according to the change trend of the switch voltage; and
reducing the corrected voltage to observe the change trend of the falling time of the switch voltage in the deadtime, wherein
in the case that the falling time becomes longer due to the decrease of the corrected voltage, the corrected voltage is continuously decreased to observe a reversal of the change trend of the falling time;
in the case that the falling time becomes shorter due to the decrease of the corrected voltage, the corrected voltage is increased to observe the reversal of the change trend of the falling time; and
determining the corrected voltage according to the reversal of the change trend.

8. An operation method, comprising:
performing a power factor correction by a PFC circuit to output a corrected voltage;
controlling the PFC circuit to adjust the corrected voltage;
converting the corrected voltage into a converted voltage by a resonant conversion circuit;
observing a change trend of a falling time of a switch voltage of the resonant conversion circuit in a deadtime by adjusting the corrected voltage;
determining the corrected voltage according to the change trend of the switch voltage;
dividing the deadtime into a plurality of intervals, wherein the falling time of the switch voltage in the deadtime corresponds to one of the intervals; and
reducing the corrected voltage to observe a change in the interval corresponding to the falling time of the switch voltage, wherein
in the case where the corrected voltage is reduced, and which causes the interval corresponding to the falling time to change to the right, the corrected voltage is continuously reduced to observe a reversal of the change in the interval corresponding to the falling time;
in the case where the corrected voltage is reduced, and which causes the interval corresponding to the falling time to change to the left, the corrected voltage is increased to observe the reversal of the change in the interval corresponding to the falling time; and
determining the corrected voltage according to the reversal of the change in the interval corresponding to the falling time.

* * * * *